United States Patent [19]

Chang et al.

[11] Patent Number: 5,321,833

[45] Date of Patent: Jun. 14, 1994

[54] ADAPTIVE RANKING SYSTEM FOR INFORMATION RETRIEVAL

[75] Inventors: Shih-Chio Chang, Chelmsford, Mass.; Anita Chow, Nashua, N.H.; Min-Wen Du, Acton, Mass.

[73] Assignee: GTE Laboratories Incorporated, Waltham, Mass.

[21] Appl. No.: 574,828

[22] Filed: Aug. 29, 1990

[51] Int. Cl.$^5$ ............................................. G06F 15/40
[52] U.S. Cl. .......................... 395/600; 364/DIG. 1; 364/252.1; 364/283.1; 364/225; 364/225.3; 364/225.4
[58] Field of Search ... 364/200 MS File, 900 MS File; 395/600, 650, 700

[56] References Cited

U.S. PATENT DOCUMENTS

| | | | |
|---|---|---|---|
| 4,417,321 | 11/1983 | Chang et al. | 364/900 |
| 4,422,158 | 12/1983 | Galie | 364/200 |
| 4,495,566 | 1/1985 | Dickinson et al. | 364/200 |
| 4,823,306 | 4/1989 | Barbic et al. | 364/900 |
| 4,839,853 | 6/1989 | Deerwester et al. | 364/200 |
| 4,849,898 | 7/1989 | Adi | 364/200 |
| 4,870,568 | 9/1989 | Kahle et al. | 364/200 |

OTHER PUBLICATIONS

"Extended Boolean Retrieval," G. Salton, E. A. Fox, H. Wu, CACM 26(912), Nov. 1983, pp. 1022–1036.
"Fuzzy Requests: An Approach to Weighted Boolean Retrieval," A. Bookstein, Journal ASIS, Jul. 1980, pp. 240–247.
"And-less Retrieval Toward Perfect Ranking," S. C. Chang, W. C. Chen, Proc ASIS Annual Meeting, 1987, Oct. 1987, pp. 30–35.
"Towards a Friendly Adaptable Information Retrieval System," Proc RIAO 88, Mar. 1988, pp. 172–182.

*Primary Examiner*—Kevin A. Kriess
*Attorney, Agent, or Firm*—Lawrence E. Monks

[57] ABSTRACT

An adaptive record ranking method for full text information retrieval, which quantifies the relevance of retrieved records to query terms occurring in said record. The method utilizes a multilevel weighting technique which permits user input to affect record weighting at each level of the ranking process. The method utilizes weighted attributes of properties of terms occurring in the records of the data base and compensates for the distance between adjacent words of complex terms. The method has been implemented on large full text data bases and the resulting rankings achieve a relatively high level of precision in ranking the relevance of retrieved records to a user query.

8 Claims, 4 Drawing Sheets

ADAPTIVE RANKING SYSTEM FOR INFORMATION RETRIEVAL

CROSS REFERENCE TO RELATED APPLICATION

This application is related to U.S. patent application Ser. No. 08/177,645, filed Jan. 4, 1994 which is a continuation of Ser. No. 08/060,676, filed May 10, 1993, which is a continuation of Ser. No. 07/927,784, filed Aug. 10, 1992, which is a continuation of Ser. No. 07/636,640, filed Dec. 31, 1990, entitled "VERY FAST APPROXIMATE STRING MATCHING ALGORITHMS FOR MULTIPLE ERRORS SPELLING CORRECTION" by Shih-Chio Chang and Min-Wen Du, inventors, and assigned to the same assignee as the present application, which application is incorporated herein by reference.

BACKGROUND OF THE INVENTION

This application pertains to computer-based information retrieval systems generally and, in particular, to systems which retrieve information from full text data bases. Specifically it pertains to a new, adaptive, record ranking scheme for full-text information retrieval in which records are ranked according to their relevance to query terms. The system of this invention is based on a multilevel (ML) record relevance weighting model.

In the prior art, many similarity measures have been proposed to help select relevant information out of potential hits in full-text information retrieval. Numerous term-weighting schemes have also been designed with the hope of quantifying relevance. There have also been efforts to use relevance feedback to refine or automatically generate queries in the searching process. However, because the concept of relevance is subject to user interpretation and, therefore, fuzzy in nature, it is clear that no one fixed similarity measure or weighting formula will ever be perfect.

It is preferable, then to have a flexible weighting scheme that can adapt to user expectations via a relevance feedback process. The multilevel (ML) record relevance weighting model proposed in "And-less Retrieval: Toward Perfect Ranking," by S.-C. Chang and W. C. Chen, Proc. ASIS Annual Meeting 1987, October 1987, pp. 30-35, is the only prior model aimed at providing a natural foundation for dynamically specifying and controlling the weighting and ranking process. The ML model enabled these advantages by modeling record-term-weighting criteria with multiple levels. Therefore, complex, and even conflicting, weighting criteria may be sorted out on different levels. Since each level contains only simple criteria, it is easy to describe, and to make users understand, the weighting rules under the ML model. It is therefore, possible to allow users to have direct guidance over the alteration of these criteria.

Boolean operators have been known to be not flexible enough for information retrieval. Efforts have been made to "soften" the Boolean operators in "Extended Boolean Retrieval," by G. Salton, E. A. Fox, and H. Wu, CACM, 26 (912), December 1983, pp. 1022-1036, and "Fuzzy Requests: An Approach to Weighted Boolean Retrieval," by A. Bookstein, Journal ASIS, July 1980, pp. 240-247. But, they still preserve the operators, while the model cited above was designed to replace these Boolean operators. It is a known fact that, with any two query terms, the following relations hold between the Boolean and adjacency operators:

ADJ AND OR

That is, adjacency implies the existence of both terms; while the existence of both terms implies at least one of them is present. It was shown that the ML model was capable of capturing this natural relation between the Boolean and adjacency operators (thereby obviating their use). In order to do this, a uniform way of quantifying phrase and word occurrences to model adjacency was established.

In the cited reference, a scheme using a text editor, within an experimental information retrieval system FAIRS ("Towards a Friendly Adaptable Information Retrieval System," Proc. RIAO 88, March 1988, pp. 172-182), to modify Prolog code was presented as evidence to show that one can change the weighting formula during a search. However, applying a text editor to Prolog code is not a task that can be mastered by every user. In this application, we disclose a spreadsheet-like weighting control scheme in FAIRS which allows any user to easily control how term weighting is done with the ML model. FAIRS is written mainly in Prolog. The ability of Prolog to rewrite its rules dynamically is utilized to implement this feature.

SUMMARY OF THE INVENTION

This invention pertains to a method for adaptive multilevel record ranking for full text information retrieval systems, whereby retrieved records are quantitatively ranked with respect to their relevance to the terms of a query and wherein a user specifies relevance factors for a relative weighting of said relevance factors on each level. In a first step the user chooses a set of query terms for searching a full text data base, wherein a term might include more that one word. In a second step, the user selects and orders a plurality of relevance factors onto a number of levels, and for each relevance factor the user assigns values for attributes of the properties of said query terms which affect the relevance value of any record to his query terms for a given level of search. The user then requests a search of the full text data base for records containing the query terms.

In the next step the system then calculates, for each term of the query, a first relevance weight for each retrieved record containing said term as a function of the number of occurrences of the term in the record and, for a term containing more than one word, as a function of the distance between occurrences of words of the term. In the following step the system calculates, for each query term and for each of said attributes of each relevance factor, a second relevance weight value for each retrieved record as a function of said first weight value and said relevance factor. In a succeeding step, the system calculates, for each retrieved record a third relevance weight as a function of all of said second weight values for all of said query terms appearing in said record. And, in a final step, the system ranks all retrieved records according to the quantitative values of third relevance weights of each level. The rank order determined by the weights on a prior level has precedence over the order determined by the weights on a succeeding level. That is, records are ranked first by the weights on level one. If two records are found to have equal weights on level one, level two weights are used to distinguish them, and so on.

In a second aspect of the invention, the user may assign different values to the attributes of the relevance factors to obtain a ranking at a different level.

DESCRIPTION OF THE PREFERRED EMBODIMENT

Figure 1:
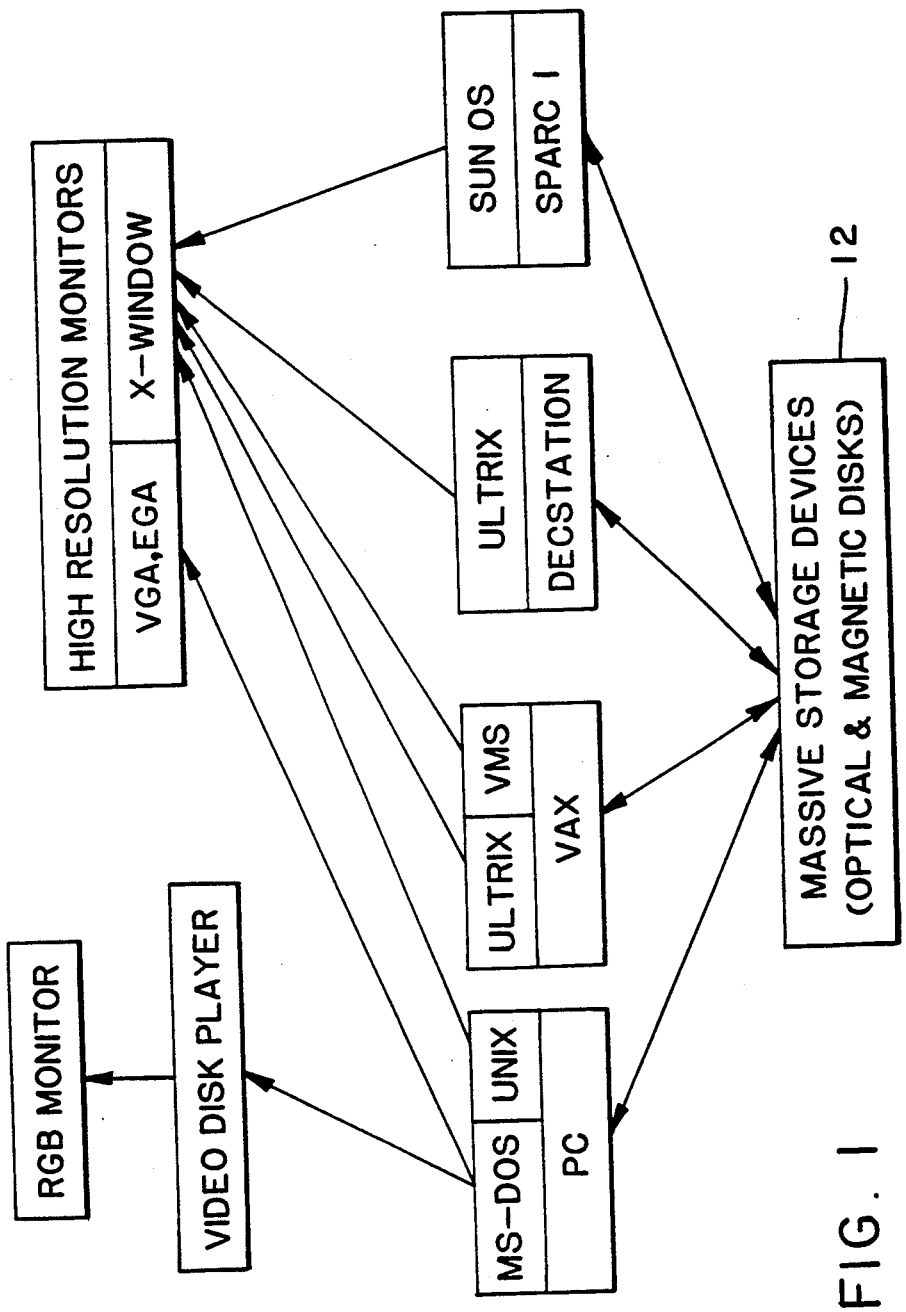
FIG. 1 is a block diagram showing the hardware and operating software systems on which embodiments of the present invention have been implemented.

FIG. 1 is a block diagram of the hardware and operating systems environment for an experimental information retrieval system designated by the acronym FAIRS and partially disclosed in the cited reference. FAIRS operates on a variety of computer systems each using its own operating system. The principal feature of all the systems is the massive data storage devices indicated by reference number 12.

Figure 2:
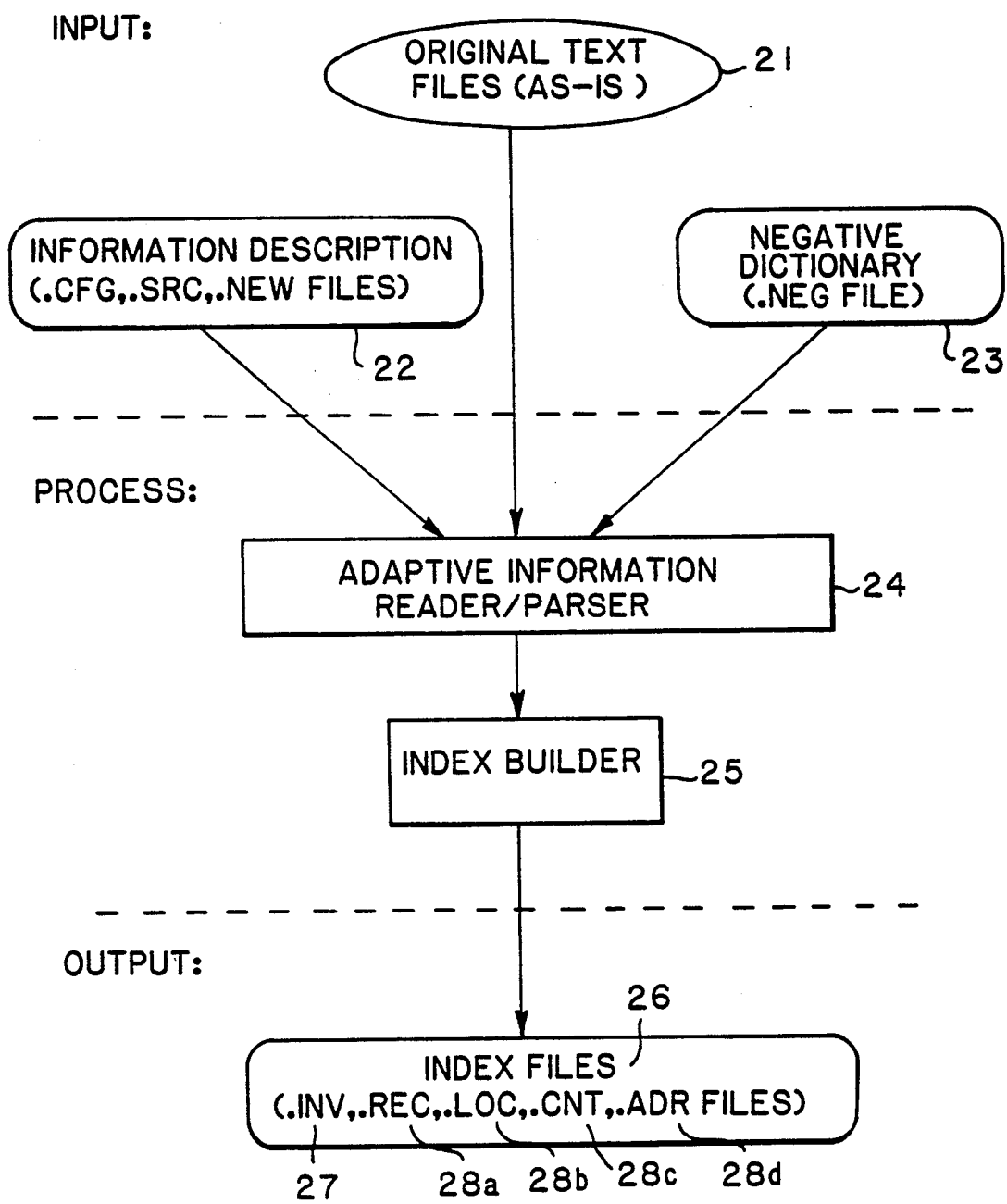
FIG. 2 is an information processing flow chart for indexing the full text data base input used in the embodiments of the present invention.

FIG. 2 is a flow chart showing the information processing flow for inputting a full text data base and indexing the data base in a large system using FAIRS. Original text files 21, are read into storage 12 as is, with the user optionally specifying record markers, each file being named and having .TXT as an extension to its file name. The user also describes his files to the system 22, providing a list of his files with .SRC as the extension, the configuration of his files with .CFG as extension, and additional new files with .NEW as extension. The user also provides a negative dictionary 23 (.NEG) of words not to be indexed. The inputs 21, 22, 23 are processed by an adaptive information reader/parser 24 under the FAIRS program. As part of the process an INDEX builder 25, produces the index files 26 necessary for retrieval. A major component of index files is an inverted file .INV 27, which is an index to the locations of all occurrences of word in the text files 21. The remaining index files (28a, 28b, 28c, 28d) contain the location of the records having each word (.REC), the location of occurrences of the word (.LOC), the address of each record (.ADR) and a utility file (.CNT).

Figure 3:
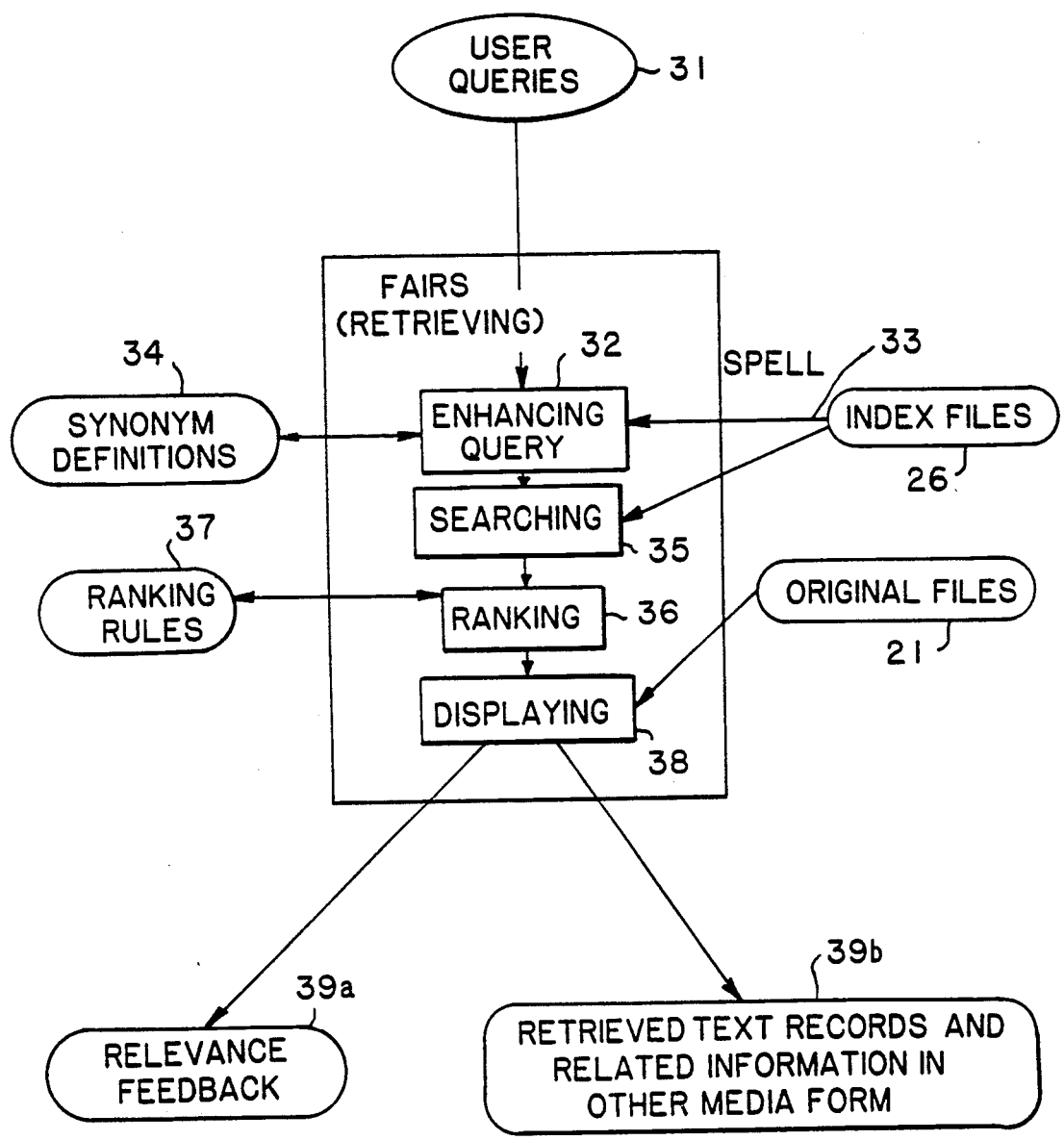
FIG. 3 is an information processing flow chart of the query process for information retrieval from the full text data bases of FIG. 2.

FIG. 3 is an information processing flow chart for retrieving information from the files inputted into the system through queries. A user query 31 is enhanced 32 by checking it for spelling variation 33 and synonym definitions 34. After the user verifies the query the index files 26 are used to search 35 for records containing the query terms. The records found in the search are ranked 36 according to ranking rules 37. The original files 21 are the displayed 38 for user feedback. At this point the user can feedback relevance information 39a to refine the search or accept the retrieved text records 39b and transfer them to other media for further use.

The present invention pertains directly to the ranking of the files in this information flow and to the user relevance feedback.

We shall give a brief overview of the ML weighting model and the adjacency model proposed in our earlier publication cited above and then describe how this is instantiated in our spreadsheet-like scheme in place of a text editor.

Vector-based similarity measures have often been used to model record relevance in the hope that vector similarity measurements would somehow quantify the relevance relation of the queries or records represented by the corresponding vectors. There has been two types of efforts to design or refine a vector-based similarity measure. The first type is to use some vector similarity formula, such as the inner product or cosine measures. The second type is to use various weighting functions representing certain properties of terms' occurrences, such as word frequency counts.

The ML model may be viewed as one of the second type of effort in one sense. However, the ML model is different from traditional weighting and relevance models because it is especially designed to model the relevance between a query and a record. It is not meant for measuring relevance between two records. That is why the ML model purposely allows identical vectors to be measured less relevant, which seems against the traditional spirit of vector-based similarity measures.

In terms of a vector space, the ML relevance weighting model to estimate the relevance between query Q and record R with a vocabulary (dimension of n possible words) may be expressed as $$f(W_Q \cdot W_{Ri} | 1 \leq n \leq n+m) \qquad \text{Eq. (1)}$$

where Q' is a superset of Q. Q' may contain m extra "dummy words" (to be defined later) created from Q by the model. The two weighting functions functions, $W_Q$, $W_R$ are very different. The query-term-weighting function $W_Q$ is always binary, even though the user may specify an explicit weight for a query term. The record-term-weighting function $W_R$ maps record terms to vectors. The main emphasis of the ML model is put on $W_R$, which has multiple levels and can, therefore, address complex and even conflicting (on different levels) user interpretations of relevance.

If we substitute in Eq. (1) the function $f$ by a summation over all i's, Eq. (1) looks exactly like an inner product with the exception of the operator "*" being a multiplication between a scalar and a vector. In fact, that is exactly what is done in our spreadsheet-like scheme.

In the ML model, a simple query format is assumed:

$$TERM_1, TERM_2, \ldots, TERM_i$$

The commas in the query are used to identify term boundaries. $TERM_i$ may be a single word (simple term or a phrase (complex term). Adjacency is modeled first in preparation for the ML model.

ADJACENCY MODELING

Consider a complex query term consisting of s words $$Wd_1, Wd_2, \ldots, Wd_s.$$

We create s−1 dummy words $$Wd_{12}, Wd_{23}, \ldots, Wd_{(s-1)s}.$$

to represent the adjacency relation between consecutive words. That is, $Wd_{ij}$ represents the adjacency between words $Wd_i$ and $Wd_j$. These dummy words are created to account for the effect of distances between occurrences in a record of the word pairs.

Each occurrence of a dummy word is defined as follows: Let us assume $Wd_i$ and $Wd_j$ are a pair of adjacent words in a complex term $Wd_1, Wd_2, \ldots, Wd_s$ of a query. We further assume that the word pair ($Wd_i$ and $Wd_j$) is to occur in a record with a minimal distance d, which is calculated by viewing record as a linear string of words and the distance d being 1+(the number of words in between), Each such occurrence of $Wd_iWd_j$ would then contribute:

$$\frac{1}{2s-1} \cdot \frac{1}{d^k}, k \geq 1 \qquad \text{Eq. (2)}$$

to the total occurrence of the term $Wd_1, Wd_2, \ldots, Wd_s$ where k is currently set to 1 in our implementation. The number $2s-1$ is the sum of the number of actual words, s, and the number of dummy words, $s-1$. We assume that both the actual occurrences of the words and their adjacency existence contribute equally to the occurrence of the term, while the adjacency factor is adjusted according to their distances. Therefore, if the two words $Wd_i$, $Wd_j$ are adjacent to each other in the record (i.e., with distance d=1,) then we would count a full one (1/1) occurrence toward the total number of occurrences of the dummy word $Wd_{ij}$. But if the pairs appear at a greater distance, the significance of the occurrence will be phased out accordingly.

Therefore, in the definition of the ML model when the name "term" is used, it means a word or a dummy word. A phrase is defined in terms of the words in the phase and the corresponding dummy words.

For example, assume we have a phrase AB (s=2), and a record consisting of

-AB-B-A-B- where dashes indicate the occurrence of irrelevant words. The dummy word $Wd_{AB}$ is represented by the two occurrences of AB and A-B with distances 1 and 3, respectively. The total number of occurrences of $Wd_{AB}$ in this record would thus be computed as $$\frac{1}{1} + \frac{1}{3} = 1\frac{1}{3}$$

At the same time, there are 5 occurrences of the actual words A and B. Therefore, the total occurrences of term AB is computed as $$\frac{1}{2s-1}\left(5 + 1\frac{1}{3}\right) = \frac{1}{3} \cdot 6\frac{1}{3} = \frac{19}{9} = 2\frac{1}{9}$$

Thus, the dilemma of specifying whether words A and B are to be adjacent or, say, within five words of each other, is over. All the user has to do is to specify the words in a phrase, and the closer the occurrence between the words in a record, the more likely the record will get a higher weight.

THE MULTILEVEL MODEL

For a given query, the relevance weight $W_{tr}$ of a given term t in a record r is represented by an ordered n-tuple (vector)

$$W_{tr} = (F_{1tr}, F_{2tr}, \ldots, F_{ntr}),$$

where $F_{itr}$'s are real valued functions. The relevance factors $F_{itr}$'s are ordered by their relative importance as determined by the user. That is, $F_{1tr}$ is more important than $F_{2tr}$, $F_{2tr}$ is more important than $F_{3tr}$, and so forth in terms of determining the relevance. The ranks for the retrieved records are then decided by ordering the relevance vectors according to the values in the n coordinates.

For each factor $F_{itr}$, there are some, say k, attributes A for term t in record r, that may affect its value. These attribute functions map each query term into a real number to indicate some properties of the term occurred in a record. $F_{itr}$ can then be expressed as $$F_{itr} = (F_i, A_{1tr}, \ldots, A_{ktr}),$$

where $A_{jtr}$ is the j-th attribute of term t in record r.

Because the query-term-weighting function is always binary, the record-term-weighting function $W_{ir}$ on level i to estimate the relevance of record r to a query Q is $$W_{itr} = f(F_{itr}, t \in Q' \cap Q \cup \{\text{dummy words generated from Q}\}) \qquad \text{Eq. (3)}$$

The intuition behind the model is that the relevance of a retrieved record is judged by a user according to several factors, each on a different priority level. On each level, the factor is weighted using a set of attributes. For example, the AND over OR preference may be expressed as a level where only the criterion of whether all search words are present is considered. This will become clearer in the following sections.

AN ADAPTABLE SPREADSHEET-LIKE SCHEME BASED ON THE MULTILEVEL WEIGHTING MODEL

The ML model essentially says that each occurrence of a search word in a record in the textbase is significant in some way to relevance (to the query) estimation of the record. The magnitude of significance of the relevance is to be defined according to the ML weighting model. The contribution of each word occurrence towards the significance of the record in the relevance estimation is quantified by some attributes of such occurrence at various levels. Based on these guidelines, we start constructing our weighting formula.

Note that, it suffices to establish a relative ordering for relevance estimation. That is, we only have to know record A is more relevant than record B, but not necessarily to know by how much. This greatly simplifies the way the ranking formula will be constructed. We therefore selected multiplication and addition as the primary operators in constructing a formula for computing the relevance weight factors $W_{ir}$ at each level i for record r. They are the simplest mathematical operations that preserve the ordering of positive numbers. That is, $$a \geq b, c \geq d \quad a \cdot b \geq c \cdot d$$

for a, b, c, d > 0 where · is either a multiplication or an addition.

We have chosen multiplication to connect all attributes $A_i$'s for the same term t each time it occurs in a record. While the numbers representing attributes of a term may mean different things, multiplication tends to preserve all weighting information, while addition may discriminate against small numbers. At the same time, with multiplication, the reciprocal can be readily used to represent negative effects.

Of course, the above arguments assume that all attributes are created equal. To compensate for possible user bias towards some attributes over others, we provide the option of a constant coefficient for each attribute $A_j$ on level i. Therefore, $F_{itr}$, the relevance weighting factor at level i and for term t in record r, is now instantiated to be:

$$F_i(A_{1tr}, \ldots, A_{ktr}) = \prod_{j=1}^{k} C_{ij}^? \cdot X_{ijtr} \qquad \text{Eq. (4)}$$

where $$X_{ijtr} = \begin{cases} A_{jtr} & \text{if attribute } A_{jtr?} \text{ has a positive impact on level } i \\ \dfrac{1}{A_{jtr}} & \text{if attribute } A_{jtr?} \text{ has a negative impact on level } i \\ 1 & \text{otherwise.} \end{cases}$$

Since $F_{itr}$'s, are obtained through the same process with the same set of attributes and are, thus comparable, it is reasonable to use summation. Therefore, we chose summation in the place of the function f in the ML model. Because the query-term-weighting function is binary, according to the ML model, the weighting function $W_{ir}$ at level i to estimate the relevance of a record r to a query Q is then $$W_{ir} = \sum_{i \in Q' \cap rj = 1} \prod^{k} C_{ij} \cdot X_{ijtr} \text{ where}$$

$$Q' = Q \cup \{\text{dummy words generated from } Q\}$$

A spreadsheet-like adaptable scheme which implements the relevance formula defined above is described in the following section.

WEIGHTING ATTRIBUTES AND THEIR IMPACTS

Currently, we allow the user to control the impacts of only five attributes for each search term occurrence in a record in the weighting and ranking process. These five attributes are easy to understand and intuitive. The five attributes are:

1. Importance: Relative weight of the term assignee by the user.
2. Popularity: The number of records in the textbase which have the term.
3. Frequency: The number of occurrences of the term in the record(s).
4. Record Id: The identification number of the record.
5. Word Location: The average position of the word occurrence within a record.

Among the five attributes, Popularity and Frequency are most often used as weighting functions to quantify a record term. Importance is also frequently used, but more often as a qualifier for query terms rather than record terms. The attributes Record ID and Word Location were rarely used as term-weighting factors, while they do sometimes affect relevance judgements. The Record ID numbers usually indicate the chronological order in which the records are put into the textbase, which may affect a user's preference. Also, the location of a word may also mean something to a user. For example, when searching a collection of papers, the words which appear in the beginning are likely to be the words used in the title or the abstract, while words at the end are more likely to appear in the references. A user may find one of these situations more important to him. The five attributes are very different, yet they all fit well in the ML model.

For each attribute, one of three potential impacts may be specified: positive, negative, or neutral. "Positive" means the value of this attribute should have positive impact on the relevance of the record. This attribute should therefore be multiplied on the relevance estimation for this record. "Negative" means this attribute has a negative impact on the relevance of the record. In this case, the reciprocal of the attribute value is multiplied for the relevance estimation of the record. "Neutral" means there is no effect of this attribute towards the relevance estimation of this record. As the result of selecting this option, the relevance estimation of the record is always multiplied by a constant 1.

For each potential impact (except neutral), a coefficient may be specified to further qualify the attribute. For example, a positive impact with coefficient 3 means the attribute value is tripled before becoming a multiplier in the relevance estimation. This may be used to stress a certain attribute over others. Of course, the coefficient concept may be extended to cover other types of computation such as exponentiation and addition. However, we felt multiplication might be sufficient for this purpose.

The current default in FAIRS for the weighting rules are as follows (all coefficients are set to 1 as indicated in the parenthesis):

FOR EVERY SEARCH WORD FOUND IN A RECORD, THE CURRENT IMPACTS OF ITS ATTRIBUTES ON THE RANK OF THE RECORD AT EACH LEVEL:

| Levels/Attrs | Importance | Popularity | Frequency | Rec-ID | Word-Loc |
|---|---|---|---|---|---|
| Level 1 | neutral (x1) | neutral (x1) | neutral (x1) | neutral (x1) | neutral (x1) |
| Level 2 | positive (x) | neutral (x1) | neutral (x1) | neutral (x1) | neutral (x1) |
| Level 3 | neutral (x1) | negative (x1) | neutral (x1) | neutral (x1) | neutral (x1) |
| Level 4 | positive (x1) | negative (x1) | positive (x1) | neutral (x1) | neutral (x1) |
| Level 5 | neutral (x1) | neutral (x1) | neutral (x1) | neutral (x1) | negative (x1) |
| Level 6 | neutral (x1) | neutral (x1) | neutral (x1) | positive (x1) | neutral (x1) |

Each impact or coefficient may be changed independently. Levels may be added or deleted at will. An underlying formula generator then converts the rules into corresponding executable Prolog code. FAIRS also provides extensive relevance feedback (preview) mechanisms (see "Towards a Friendly Adaptable Information Retrieval System," by S. C. and A. Chow, PROC. RIAO 88, March 1988, pp. 172–188.) for the user to judge if the current rules are adequate.

The formula generation process is straightforward except for the "dummy words" created by the ML model for adjacency handling. Essentially, it is a way to count the Frequency of the occurrences of a phrase in a record. Each "occurrence" of such dummy words may carry a value between 0 and 1, which represents part of that phrase frequency. The formula generator selects the maximum value among all occurrences of a dummy word in a record when the attribute Frequency is set to neutral (which means, no matter how many occurrences there are for the dummy word, only one will be counted, and we pick the most significant one). Otherwise, the average value of all occurrences of a dummy word is used.

As shown in the above default settings, the records are ranked by the "Coverage" of the search words (Level 1), i.e., how many distinct search words a record has. This takes care of the AND case. That is, records with all the search words will be ranked highest. If no such record exists, records with the highest coverage will be selected naturally. Given k search terms, the records retrieved will be ranked automatically in the following manner:

(has all terms), (any k-1 terms), (any k-2 terms), . . . any one term)

This is already better than an "ANY N" operator, and there is no need for a user to reshuffle the Boolean operators to get an acceptable response.

At the second through the fourth levels the default settings state that the importance of a search word and its frequency of occurrence in the record should have positive impact on the relevance estimation while the popularity of the word has negative impact. Their corresponding impacts are considered in the listed order.

The fifth level default setting states that, all else being equal, rank the records in the reverse order according to their identification number. When the record id numbers indicate the chronological order in which they are put into the textbase, the third-level rule is equivalent to ranking the latest record highest.

The sixth level in our default setting indicates that, all else being equal, give a record higher weight if it has the search words up front, that is, at the beginning of the document or record.

Some variations of this basic setting can be easily done in an obvious way. For example, we have seen some users move level 6 up to level 2 to emphasize the importance of the occurrence of the search words.

Figure 4:
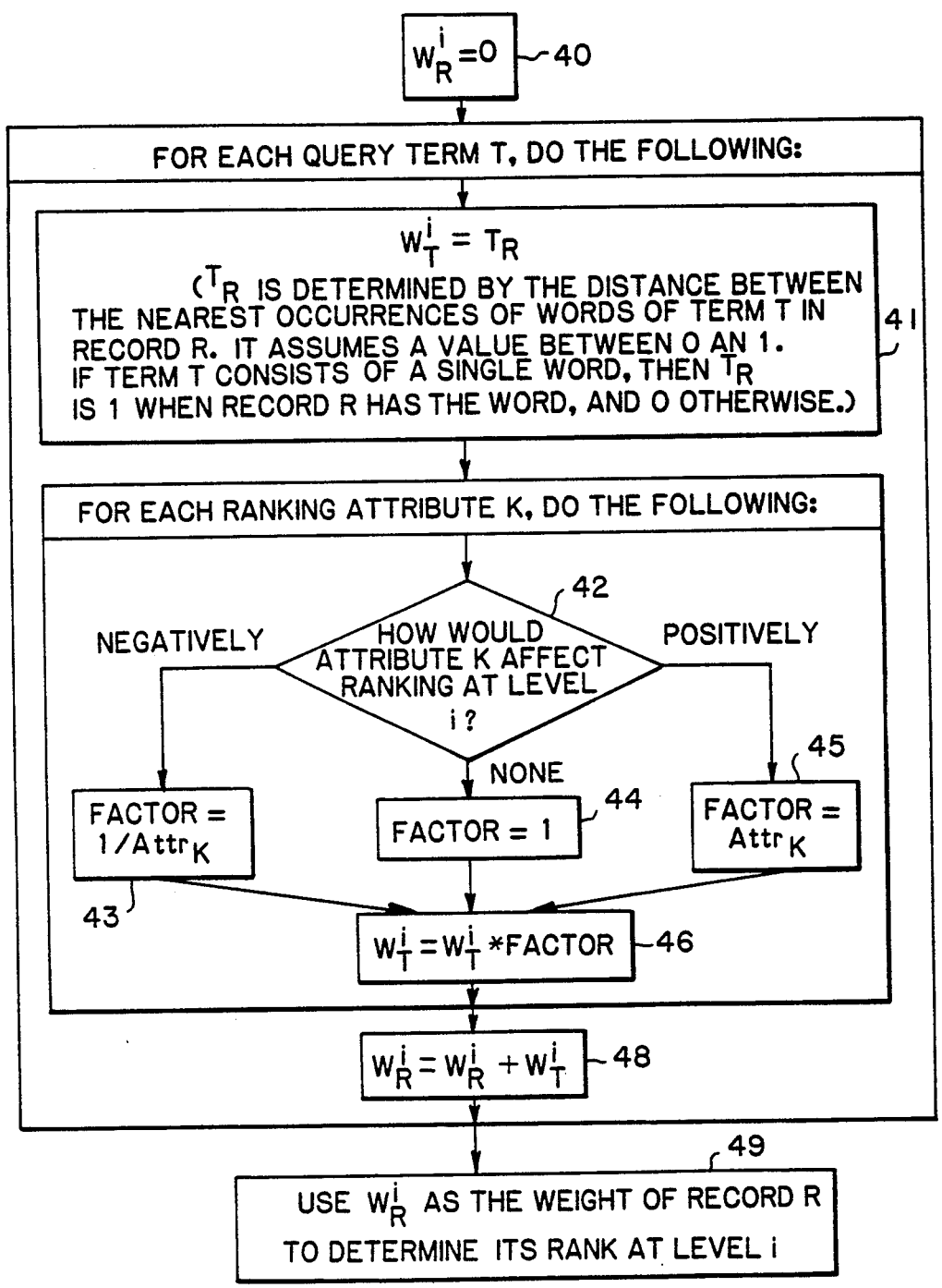
FIG. 4 is a flow chart of one embodiment of the adaptive ranking system of the present invention showing the record weight determination at a given level.

FIG. 4 is a flow chart of the record weight determination at any level, which is under the control of the user.

Initially, the weight factor W for a record R at level i is, $W_R^i = 0$ (40).

Then, for each query term the term user knows that he does not have to specify an adjacency factor because the weight W of a term T at level i is, $W_T^i = T_R$ equal to $T_R$, which is determined by the distance of the nearest occurrences of words of term T in record R, 41. Thus, $T_R$ assumes a value between 0 and 1, as explained above.

Then the user can qualify each ranking attribute by adjusting its coefficient 42. For each ranking attribute k he specifies whether its potential impact on relevance of the record R to the query Q is negative 43, positive 44 or neutral 45. This selects the coefficient factors $1/attrs_k$, 1 or $Attrs_k$. Then the systems multiplies the original weight of the term by the factor to obtain a new weight for the term, 46, $W_T^i = W_T^i$ multiplication factor. Then, the weight W of a record R at level i $W_R^i$ is its previous weight plus the weight of term T at level i, $W_R^i = W_R^i + W_T^i$ 48.

By repeating this process for all terms T at all levels i, the weight of a record is determined, 49. When the process is completed for all records, the relevance of each record in the database to the query is established.

In this application, we have disclosed a new way to present and control the ranking process in full-text information retrieval. The user is informed of the weighting scheme and is in full control. This version of FAIRS has been distributed to users within the assignee for formal evaluation. The initial evaluation of this scheme has been very favorable. The users have been given an unprecedented power in controlling the searching and ranking process in information retrieval.

While some attributes may have fairly natural and obvious implications on record relevance weighting, it is evident that there is no general consensus on the relevance impact of some other attributes, such as the Record ID and Word Location. Their utility is subjective, depending on what the user thinks at the time. The existence of such attributes proves clearly there is no such thing as a perfect fixed ranking strategy for every situation. Adaptive ranking schemes such as the one disclosed here open up the possibility of letting a user design his own search.

This current implementation of the ML weighting model is still confined by a fixed number of attributes provided by the system. Allowing the user to define his own attributes to be used in the ML weighting rules will greatly enhance the user's power in controlling the ranking process.

We claim:

1. A method for adaptive, multilevel record ranking by a computer system having a monitor for output display of record responses to a query directed to a full-text data base whereby retrieved records are quantitatively ranked with respect to their relevance to the terms of a query, comprising the computer implemented steps of:

receiving a set Q of query terms t, wherein a term t may include more than one word, to form a query full-text searching;

receiving a plurality of ordered relevance factors to modify said query terms onto a number of levels;

receiving, for each relevance factor F, assigned values for attributes of properties of said query terms t which affect the relevance value of any record r to query terms t for each level;

searching a full text data base to retrieve records containing said query terms t;

calculating, for each query term t, a first relevance weight for each retrieved record r as a function of its occurrence in record r and, for a term having more than one word, the distance between the nearest occurrences of words of said term t in record r;

calculating, for each query term t and for each of said attributes, a second relevance weight value for each retrieved record r as a function of said first relevance weight value and said attributes affecting said relevance factor;

calculating, for each retrieved record r, a third relevance weight as a function of all of said second relevance weight values for all of said query terms t appearing in said record r;

using said third relevance weight as the weight of record r to determine its rank at each level;

ranking all retrieved records according to the quantitative values of said third relevance weights at each level with respect to all query terms in said query Q; and displaying retrieved records in ranked order.

2. The method of claim 1 further comprising the steps of:

receiving for each relevance factor F, at least one different reassigned value for at least one attribute of properties of said query terms t which affect the relevance value of any record r to query terms t for each level;

searching a full text data base to retrieve records containing said query terms t;

recalculating successively said first, second and third relevance weights for each level; and ranking all retrieved records according to the quantitative values of said recalculated third relevance weights at each level, where a successive level gives precedence to a prior level.

3. The method of claim 1 wherein the step of calculating a first relevance weight further comprises the steps of:

counting each occurrence of t as 1, if t is a single word;

counting each occurrence of t plus each occurrence of each word in t, where t contains s words, s>1, by counting adjacency occurrences of consecutive pairs of words in term t, where the distance d between occurrences of words in said pairs is 1+ the number of words in between said occurrences, according to the formula:

$$\frac{1}{2s-1} \cdot \frac{1}{d^k}, k \geq 1$$

summing the counts of the s words within term t and the adjacency counts; and multiplying said sum by $$\frac{1}{2s-1}.$$

4. The method of claim 1 wherein the step of calculating a second relevance weight further comprises the steps of:

receiving a set of attributes A for each query term t which impact the relevance of that term t for a record r at a level i;

receiving, for each attribute a, a coefficient to multiply its value relative to other attributes;

receiving, for each attribute a of each term t in record r, a value indicating whether the impact of said attribute is positive, neutral or negative; and multiplying said first calculated relevance weight of each term t in record r by said relevance impact factor of each of said attributes of t, resulting in said second calculated relevance weight.

5. The method of claim 1 wherein the step of calculating said third relevance weight further comprises the steps of:

summing the individual second calculated relevance weights for each attribute of each query term t appearing in record r to obtain the weighted relevance of record r for each level.

6. The method of claim 3 wherein said set of attributes received as relevance weight functions to quantify a record term includes:

importance, the relative weight of term t assigned by the user;

popularity, the number of records in the text base having term t;

frequency, the number of occurrences of term t in a record r;

record id, the identification number of record r;

word location, the average position of the occurrences of a word of term t in a record r.

7. The method of claim 4 wherein the step of assigning values to the impact of an attribute of the occurrence of a term t in a record r comprises:

assigning a value $A_{jtr}$ if attribute $A_{jtr}$ has a positive impact on level i;

assigning a value $1/A_{jtr}$ if attribute $A_{jtr}$ has a negative impact on level i; and assigning a value 1 otherwise.

8. The method of claim 1 wherein the relevance of a record r to a query Q is $$W_{ir} = \sum_{i \in Q' } \prod_{\cap rj=1}^{k} C_{ij} \cdot X_{ijtr} \text{ where}$$

$Q' = Q \cup$ {dummy words generated from $Q$}.

* * * * *